United States Patent
Fuchs et al.

(10) Patent No.: US 6,592,863 B2
(45) Date of Patent: Jul. 15, 2003

(54) NUTRITIONAL COMPOSITION

(75) Inventors: Eileen C. Fuchs, Gaylordsville, CT (US); Clara L. Garcia-Rodenas, Forel (CH); Yves Guigoz, Epalinges (CH); Peter Leathwood, Blonay (CH); Kristel Reiffers-Magnani, Rotterdam (NL); Chandrasekhara R. Mallangi, New Milford, CT (US); Marco Turini, Epalinges (CH); Helen Gillian Anantharaman, Shanghai (CN)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/821,499

(22) Filed: Mar. 29, 2001

(65) Prior Publication Data

US 2002/0044957 A1 Apr. 18, 2002

Related U.S. Application Data

(60) Provisional application No. 60/227,117, filed on Aug. 22, 2000.

(51) Int. Cl.[7] .................... A01N 63/00; A23L 1/30; A23C 21/00; A23J 1/00; A23G 3/00
(52) U.S. Cl. .............. 424/93.1; 426/72; 426/583; 426/590; 426/648; 426/656; 426/658
(58) Field of Search .............. 424/93.1; 426/648, 426/656, 658, 590, 583, 72

(56) References Cited

U.S. PATENT DOCUMENTS

| | | | |
|---|---|---|---|
| 5,567,424 A | * | 10/1996 | Hastings |
| 5,641,531 A | | 6/1997 | Liebrecht et al. |
| 5,922,375 A | * | 7/1999 | Luchansky et al. |

FOREIGN PATENT DOCUMENTS

| | | | |
|---|---|---|---|
| EP | 0 486 425 B1 | | 8/1994 |
| EP | 1048226 | * | 11/2000 |

OTHER PUBLICATIONS

Hui, Y.H. (ed), Bailey's Industrial Oil and Fat Products, 1996, John Wiley and Sons, N.Y., p. 613.*
Sigma Chemical Company Catalog, 1994, St. Louis, item G0752.*

* cited by examiner

Primary Examiner—Christopher R. Tate
Assistant Examiner—Kailash C. Srivastava
(74) Attorney, Agent, or Firm—Belly, Boyd & Lloyd LLC

(57) ABSTRACT

A composition for a nutritional supplement for convalescing patients recovering from illness or surgery, those with limited appetite such as the elderly, children or anorexic patients, or those who have impaired ability to digest other sources of protein such as persons having chronic gastritis who have a reduced gastric pepsin digestion. The supplement comprises: (i) a protein source which provides at least about 8% total calories of the composition and which includes at least about 50% by weight whey protein; (ii) a lipid source having an omega 3:6 fatty acid ratio of about 5:1 to about 10:1 and which provides at least about 18% total calories of the composition; (iii) a carbohydrate source; and (iv) a balanced macronutrient profile comprising at least vitamin E and vitamin C. The supplement has reduced capacity to induce satiety. Also disclosed are a method of production of the composition; use of the composition in the manufacture of a functional food or medicament; and a method of treatment which comprises administering an effective amount of the composition.

23 Claims, No Drawings

NUTRITIONAL COMPOSITION

This application claims the benefit of U.S. Provisional Application Ser. No. 60/227,117 filed on Aug. 22, 2000.

BACKGROUND OF THE INVENTION

The present invention relates to a composition for a nutritional supplement; a method of production of the composition; use of the composition in the manufacture of a functional food or medicament for the nutrition, prevention or treatment of convalescing patients recovering from illness or surgery, those with limited appetite such as the elderly, or anorexic patients, or those who have impaired ability to digest other sources of protein such as persons having chronic gastritis who have a reduced gastric pepsin digestion; and a method of providing nutrition or treatment which comprises administering an effective amount of the composition.

Many people do not take in sufficient nutrients for a nutritionally complete diet. In order to assist these people, nutritional supplements have been developed. Nutritional supplements are usually not intended to provide all the nutrients necessary for a nutritionally complete diet; instead they are generally intended to supplement the diet such that it becomes more nutritionally complete. However, in some instances they may provide complete nutrition.

There are many targets for nutritional supplements; for example sick patients, convalescing patients, anorexic patients and the elderly. For sick and convalescing patients, the spontaneous intake of food is often lower than normal and insufficient to meet nutritional needs. Recovery and restoration of strength may therefore be impaired. A significant proportion of the elderly, on the other hand, tend to eat too little to meet all of their nutritional needs. This is usually due to reduced energy needs following reduction in body weight and diminished physical activity. Anorexic patients by definition suffer a loss of appetite and do not take in sufficient nutrients. In all cases, supplementation to provide missing nutrients can offer advantages.

Various nutritional supplements are available. A family of supplements commonly found in North America is sold under the name ENSURE by Ross Laboratories. The protein source used is predominantly caseinate and soy protein isolates. Another family which is commercially available is sold under the name RESOURCE by Novartis Nutrition Ltd. In this case, the protein source is based on caseinates. Another family which is commercially available is sold under the name NUBASICS by Nestlé Clinical Nutrition. In general, the protein source used in products of this family is caseinate. However, it is found that these products suffer from the problem that they do not necessarily result in a consumer receiving sufficient nutrients; either because an insufficient amount of the product is consumed or insufficient other foods are consumed. This is especially the case with convalescing patients, the elderly and other anorexic patients where loss of appetite leads to insufficient nutrients being consumed.

Nutritional supplements which are based on other protein sources, such as whey protein, are also available or have been described in the literature. In general, the nutritional supplements based upon whey protein are provided in the form of fruit juices; for example as described in European patent application 0486425 and U.S. Pat. No. 5,641,531. However, these products suffer from the problem that they generally do not provide a lipid source despite the fact that lipids are essential for adequate nutrition.

Therefore, a need exists for a nutritional supplement which contains protein, lipid and carbohydrate sources. In addition, a need exists for a composition that is capable of providing the special nutritional requirements of those with limited appetite such as the elderly or those who have impaired ability to digest other sources of protein such as persons having chronic gastritis who have a reduced gastric pepsin digestion.

SUMMARY OF THE INVENTION

Remarkably, a composition has now been found that addresses the problems set out above and enables such persons to retain or regain their strength.

In a first aspect the invention provides a composition for a nutritional supplement which comprises (i) a protein source which provides at least about 8%, total calories of the composition and which includes at least about 50% by weight of whey protein comprising a fraction of at least partially hydrolyzed whey protein; (ii) a lipid source having an omega 3:6 fatty acid ratio of about 5:1 to about 10:1 and which provides at least about 18% of the total calories of the composition; (iii) a carbohydrate source which provides the remaining calories of the composition; and (iv) a balanced macronutrient profile comprising at least vitamin E and vitamin C.

Within the context of this specification the word "comprises" is taken to mean "includes, among other things". It is not intended to be construed as "consists of only".

In a second aspect the invention provides a method of production of the composition which comprises blending the components in the required amounts.

In a third aspect the invention provides use of a composition according to an embodiment of the invention in the manufacture of a functional food or medicament for the nutrition, prevention or treatment of convalescing patients recovering from illness or surgery, those with limited appetite such as the elderly, or anorexic patients, or those who have impaired ability to digest other sources of protein such as persons having chronic gastritis who have a reduced gastric pepsin digestion.

In a fourth aspect the invention provides a method of nutrition, prevention or treatment of convalescing patients recovering from illness or surgery, those with limited appetite such as the elderly, children or anorexic patients, or those who have impaired ability to digest other sources of protein such as persons having chronic gastritis who have a reduced gastric pepsin digestion which comprises administering an effective amount of a composition according to an embodiment of the invention.

Surprisingly it has now been found that a composition for a nutritional supplement in accordance with the invention, because it contains whey protein, is easier to digest and less prone to induce satiety. Therefore the problem of a patient not consuming a sufficient amount of the supplement may be reduced. Similarly, the problem of a patient not consuming sufficient other foods may be reduced. Further, the composition has a well balanced lipid profile which provides a readily available energy source.

Preferably an embodiment of the composition includes whey protein as the primary source of protein (amino acids). The whey protein can be sweet whey or acid whey or a combination thereof. Preferably it is in the form of a whey protein partial hydrolysate produced by enzymatic treatment, preferably with trypsin, Alcalase or Novozyme, of whey protein and therefore is less viscous, lighter and provides the advantage that it is more easily digested than known compositions for fortified beverages and nutritional supplements.

It should be appreciated that the present invention is not limited to a whey protein hydrolysate. For example, a non-hydrolyzed whey protein can be used, preferably when the composition is made in a powder form.

The partial hydrolysis of whey protein with one or more of the above enzymes could be carried out at a pH ranging from about 6.6 to 8.8 (preferably about 8.5) and a temperature of about 40 to about 70° C. (preferably about 65° C.) at an enzyme concentration of about 0.5 to about 2.5 (preferably about 1.0) percent of the protein. Preferably, enzyme treatment is carried out for about 5 to about 120 minutes (preferably 15 minutes) to achieve adequate hydrolysis.

Preferably the whey protein hydrolysate represents a minimum of 50% of the protein content in the formulation. It is preferably the sole protein source but may be combined with intact whey protein or other protein or peptide sources including peptides naturally found in whey or milk such as caseino glycomacropeptide (CGMP). Surprisingly, it has been found that, despite the high proportion of partially hydrolyzed protein, in the composition it is physically stable and has a very acceptable taste due to the process used to prepare the hydrolysate and the selection of a flavoring system to give an acceptable organoleptic profile.

Preferably, at least about 50% by weight of the whey protein is hydrolyzed. Most preferably, at least about 70% by weight of the whey protein is hydrolyzed.

Preferably the protein source provides about 8% to about 20%, more preferably an embodiment for adults comprises a protein source which provides about 15% to about 18% (most preferably about 16%) of total energy of the composition. Preferably an alternative embodiment is suitable for children and it comprises a protein source which provides about 8% to about 14% (most preferably about 12%) of total energy of the composition.

Remarkably, because of the nature of the whey protein and the fact that it is capable of being easily digested, the composition has a beneficial effect in persons requiring a nutritional supplement such as those recovering from illness or surgery, those with limited appetite such as the elderly or those who have problems digesting other sources of protein such as persons having chronic gastritis who are known to have a reduced gastric pepsin digestion. Remarkably, the composition enables such persons to retain or regain their strength quickly and therefore helps aid recovery of a convalescing patient.

Preferably the lipid source comprises about 40% to about 65% by weight of monounsaturated fatty acids; and about 15% to about 30% by weight of polyunsaturated fatty acids. The saturated fatty acid content is preferably less than about 30% by weight. Up to 20% by weight of medium chain triglycerides may be incorporated into the fat blend to failitate digestion. The lipid source may contain at least about 30 mg of vitamin E per 100 g of lipid source.

Preferably the lipid source provides about 25% to about 35% of total energy of the composition, more preferably about 30% of total energy of the composition.

Preferably the carbohydrate source comprises sucrose, corn syrup, maltodextrin or a combination thereof. Preferably the carbohydrate source provides about 50% to about 60% of total energy of the composition.

Preferably, an embodiment of the composition has a micronutrient composition having a unique profile rich in nutrients including one or more selected from the group which comprises Vitamin E, Vitamin C, taurine, folic acid and vitamin B-12. Remarkably, the profile aids replenishment of nutrients required in higher quantities during periods of illness or recovery due to oxidative stress or inflammatory conditions and nutrients such as vitamin B-12 that may be poorly absorbed in those suffering from digestive disorders such as chronic gastritis or those who have undergone major intestinal surgery.

Preferably the micronutrients include at least folic acid and/or Vitamin B-12.

Preferably an embodiment of the composition comprises prebiotic fiber. Preferably the fiber is selected from the group which comprises inulin, acacia gum, resistant starch, dextran, xylo-oligosaccharide (XOS), fructooligosaccharide (FOS), galactooligosaccharide or a combination thereof.

Preferably an embodiment of the composition is in a powdered form for dilution with water before use or a ready to use fortified beverage in liquid form; or in the form of a pudding with a custard or fan like texture suitable for consumption by those with dysphagia or other swallowing problems; or in the form of a bar to provide an interesting selection of different varieties.

Preferably, an embodiment of the composition is formulated for human consumption and/or administration. Preferably, an alternative embodiment is formulated for consumption by a companion animal.

Preferably, an embodiment of the composition according to the present invention comprises the addition of at least one probiotic micro-organism. The probiotic microorganism provides the advantage of restoring the natural balance of the intestinal flora following antibiotic therapy.

More preferably an embodiment of the composition in powdered form contains a lactic acid bacterium and/or its fermentation metabolites. Preferably the lactic acid bacterium is selected from the group which consists of *L. johnsonii, Lb. Paracasei* or a combination thereof. This product has the advantage of inhibiting the growth of *H. pylori* in the stomach which is associated with the development of ulcer particularly in individuals having gastritis. Most preferably the probiotic bacteria comprises a *Lb. Paracasei* strain deposited under the number NCC 2461.

An advantage of the present invention is that it provides a composition that can be provided in a functional food product and which therefore does not require special administration.

Another advantage of the present invention is that, in the form of a pudding with a thin custard or flan like texture, the product can be consumed by those suffering from dysphagia.

Another advantage of the present invention is that a preferred embodiment is rich in Vitamin E and Vitamin C and as such can be used to replete levels of these nutrients in the blood following depletion related to infection, sepsis or other oxidative stress. Preferably, an embodiment additionally comprises taurine and as such can be used to replete levels of taurine in the blood following depletion related to infection, sepsis or other oxidative stress.

Another advantage of the present invention is that a preferred embodiment is particularly rich in Vitamin B-12 and folic acid which may be poorly absorbed in patients with gastric disease or following surgery to the intestinal tract.

Additional features and advantages of the present invention are described in, and will be apparent from, the description of the presently preferred embodiments which are set out below.

DETAILED DESCRIPTION OF THE INVENTION

This invention provides a nutritional supplement which is particularly suitable for providing supplemental nutrition to an elderly patient or other anorexic patient while inducing a reduced level of satiety. Due to its components the supplement is more rapidly digested and therefore the patient is more likely to consume a therapeutically effective amount of the supplement or other food to provide for adequate nutrition.

The protein source includes at least about 50% by weight of whey protein that preferably has been at least partially hydrolyzed. The whey protein used to produce the hydrolysate may be a commercially available whey protein source; either based upon sweet whey or acid whey or a combination thereof. Preferably the whey protein is a whey protein source containing more than 80% by weight of whey protein. A suitable whey protein concentrate is LACPRODAN 9087 and suitable whey protein isolate sources include ALACEN 895 (New Zealand Milk Products Inc), BiPRO (Le Sueur Isolates of Le Sueur, Minn.), PROVON-190 (Avonmore Ingredients Inc of Monroe Wis.) and LACPRODAN 9212 (Royal Proteins, Inc of Rosemont Ill.).

The protein source may, if desired, include amounts of other suitable types of protein. For example, the protein source may further include minor amounts of casein protein, soy protein, rice protein, pea protein, carob protein, oat protein, milk protein, caseino-glyco-macropeptide or mixtures of these proteins. Further, if desired, the protein source may further include minor amounts of free amino acids. The other suitable types of protein preferably comprise less than about 50-% by weight of the protein source; more preferably less than about 30% by weight.

The protein source preferably provides about 8% to about 20% of the energy of the nutritional supplement. For example, the protein source may provide about 15% to about 18% of the energy of the nutritional supplement in an embodiment suitable for an adult or about 8% to about 14% of the energy of the supplement in an embodiment suitable for pediatric use.

The nutritional composition includes a lipid source. Preferably the lipid source provides about 18% to about 40% of the energy of the nutritional supplement; more preferably 25% to about 35% of the energy of the nutritional supplement. For example, the lipid source may provide about 30% of the energy of the nutritional supplement.

The lipid source may include medium chain triglycerides (MCT) up to a level of 20% of the total lipid by weight. The lipid source is rich in monounsaturated fatty acids. In particularly, the lipid source contains at least about 40% by weight of monounsaturated fatty acids. Preferably, the lipid source contains about 45% to about 65% by weight of monounsaturated fatty acids; for example about 55% by weight.

The lipid source may also contain polyunsaturated fatty acids. Preferably the lipid source contains about 15% to about 30% by weight of polyunsaturated fatty acids; for example about 20% by weight of polyunsaturated fatty acids. The lipid profile of the supplement is preferably designed to have a polyunsaturated fatty acid omega-6 (n-6) to omega-3 (n-3) ratio of about 1:1 to about 10:1. Preferably, the n-6 to n-3 fatty acid ratio is about 5:1 to about 9:1; for example about 7:1.

The lipid source has a saturated fatty acid content of less than about 35% by weight; including medium chain triglycerides. More preferably, the lipid source contains less than about 30% by weight of saturated fatty acids.

Suitable lipid sources include high oleic sunflower oil, high oleic safflower oil, sunflower oil, safflower, rapeseed oil, soy oil, olive oil, canola oil, corn oil, peanut oil, rice bran oil, butter fat, hazelnut oil and structured lipids. Fractionated coconut oils are a suitable source of medium chain triglycerides.

The nutritional supplement also includes a carbohydrate source. The carbohydrate source preferably provides about 40% to about 65% of the energy of the nutritional supplement; especially about 50% to about 60% of the energy of the nutritional supplement. For example, the carbohydrate source may provide about 54% of the energy of the supplement. Several carbohydrates may be used including maltodextrin, corn syrup, corn starch, modified starch, or sucrose, or fructose, or mixtures thereof. If desired, the supplement may be free from lactose.

The nutritional supplement preferably includes a complete vitamin and mineral profile. For example, sufficient vitamins and minerals may be provided to supply about 50% to about 500% of the recommended daily allowance of the vitamins and minerals per 1000 calories of the nutritional supplement. The nutritional supplement preferably is rich in vitamin E. For example, the nutritional supplement may contain between 80 International Units and 120 International Units of Vitamin E per 1000 kcal. More preferably, the nutritional supplement contains about 30 International Units of Vitamin E per 250 ml serving of the supplement. Furthermore the nutritional supplement is also rich in Vitamin C providing between about 150 and about 250 mg per 1000 kcal or preferably about 60 mg per serving. The supplement also preferably contains 200 g of folic acid and 3 g of Vitamin B-12 per serving. Alternative embodiments of the supplement for pediatric use have a modified vitamin and mineral profile specifically tailored to the special needs of this age group.

The nutritional supplement further includes a source of a soluble, prebiotic fiber. A prebiotic fiber is a fiber which beneficially affects the host by selectively stimulating growth and/or activity of bacteria in the colon which have the potential to improve host health. Suitable soluble, prebiotic fibers include fructooligosaccharides (FOS) and inulin. Suitable inulin extracts may be obtained from Orafti SA of Tirlemont 3300, Belgium under the trade mark "Raftiline". Similarly, suitable fructooligosaccharides may be obtained from Orafti SA of Tirlemont 3300, Belgium under the trade mark "Raftilose".

Preferably, both FOS and inulin are provided in a ratio of about 60: about 40 to about 80: about 20, most preferably about 70: about 30. Other possible fibers include gums such as guar gum, xanthan gum, xylo-oligosaccharides, gum arabic, pectin, acacia gum, resistant starch, dextrans or mixtures of these. The fiber selected should not induce satiety.

The soluble, prebiotic fibers are reported to promote the growth of bifidobacteria in the gastrointestinal tract and, in certain circumstances prevent or decrease the growth of pathogens such as Clostridiae. Further, promoting the growth of bifidobacteria is reported to have various other beneficial effects. Also, during fermentation of the fibers in the colon, short chain fatty acids are produced. These fatty acids are a fuel for intestinal cells.

The soluble, prebiotic fibers are preferably present in an amount sufficient to provide about 4 to about 9 g of soluble, fermentable fiber to the patient per day. Therefore the prebiotic fibers may be present in an amount of about 6 g to about 12 g per 1000 kcal. Alternative embodiments comprise blends of prebiotic fibers in an amount of 9 g or less, for example 4 g of blend.

If desired, the nutritional supplement may also contain a source of insoluble dietary fiber. Suitable sources of insoluble dietary fibers are hull fibers from legumes and grains; for example pea hull fiber, oat hull fiber, barley hull fiber, and soy hull fiber.

The nutritional supplement preferably has an energy content of about 800 kcal/l to about 2000 kcal/l; for example an energy content of about 1000 kcal/l or about 1500 kcal/l.

The nutritional supplement may be in the form of a soluble powder, a liquid concentrate, a pudding, a bar/snack or a ready-to-use formulation suitable for oral consumption or enteral administration. Ready to drink formulations are particularly preferred. Various flavors, sweeteners, and other additives may also be present. Artificial sweeteners such as acetosulfame and L-aspartyl based sweeteners may be used; for example acesulfame-K or aspartame or a mixture thereof.

The nutritional supplement may be produced, for example, by blending together the protein source, suspended in water, preferably water, which has been subjected to reverse osmosis, and the lipid source. Commercially available liquifiers may be used to form the liquid mixture If used, emulsifiers may be included in the blend. The vitamins and minerals may be added at this point but are usually added later to avoid thermal degradation. Any added lipophilic vitamins, emulsifiers and the like may be dissolved into the lipid source prior to blending. The liquid mixture is then homogenized; for example in two stages at about 7 MPa to about 40 MPa in the first stage and about 2 MPa to about 14 MPa in the second stage Protein hydrolysis is carried out as described earlier. Alternately, the whey protein may be reconstituted in water and hydrolyzed prior to the formation of an emulsion. This is the preferred procedure if a blend of hydrolyzed whey protein and other intact proteins are desired. If this is the practice adopted, then intact protein and lipid are added to the hydrolyzed whey protein following the hydrolysis procedure and the mixture is then homogenized. Termination of hydrolysis is achieved by denaturing the enzyme preferably by heat or by adjusting the pH or a combination thereof. Inactivation of the enzyme activity is accomplished by using conditions designed to minimize the detrimental effects of heat on the protein stability and product taste and quality. For example, enzyme inactivation may be achieved by heating to a temperature in the range of about 90° C. for 5 minutes to about 110° C. for about 15 seconds. This may be carried out by steam injection or by heat exchanger; for example a plate heat exchanger.

The liquid mixture may then be cooled gradually to about 20° C. to about 30° C.; for example by flash cooling and heat exchanger, preferably a plate heat exchanger. The carbohydrate source may be added at this point or later either in a dry form or as a liquid slurry. The mixture may then be further cooled to add any heat sensitive components; such as vitamins and minerals. Water, preferably water which has been subjected to reverse osmosis, may then be mixed in to form a liquid mixture. The pH and solids content of the homogenized mixture is conveniently standardized at this point.

The liquid mixture may then be thermally treated for example using an aseptic process to reduce bacterial loads and sterilize the product. For example, the liquid mixture may be rapidly heated to a temperature in the range of about 110° C. for 5 minutes to about 150° C. for about 5 seconds. This may be carried out by steam injection or by heat exchanger; for example a plate heat exchanger. The liquid mixture is then homogenized; for example in two stages at about 7 MPa to about 40 MPa in a first stage and about 2 MPa to about 14 MPa in a second stage.

If it is desired to produce a liquid nutritional supplement, the homogenized mixture is filled into suitable containers, such as cans. The filling may either be aseptic or the containers may be retorted. Suitable apparatus for carrying out filling is commercially available.

Without wishing to be bound by theory, whey protein is believed to be rapidly emptied from the stomach and readily hydrolyzed and absorbed in the intestine. This may result in a shorter post-prandial period in which the pateint feels satiated and therefore may result in a rapid return of appetite. On the contrary, proteins like casein, which are slowly emptied from the stomach, provoke a steady, prolonged post-prandial period in which the patient may feel satiated. Therefore the nutritional supplement may be used to provide supplemental nutrition to elderly and sick and convalescing patients who are prone to anorexia and/or protein-energy malnutrition.

It is also found that the amino acid profile is well suited for promoting endogenous production of glutamine. Therefore the nutritional supplement may be used as an indirect source of glutamine for animals or humans. In particular, the nutritional supplement may be used to provide nutrition to stressed patients having a depleted glutamine status; for example for patients who are critically ill, or who are suffering from sepsis, injury, burns, inflammation, or patients recovering from surgery. Further, the nutritional supplement may be used to promote glutamine synthesis in patients suffering from injured or diseased intestines or to maintain the physiological functions of the intestine. Moreover, the nutritional supplement may be used to maintain or raise plasma glutamine levels in humans and animals and improve immune function.

Further, it is found that the whey protein contains high levels of threonine, an important building block of mucins. Therefore the nutritional supplement has the advantage that it may be used to provide supplemental nutrition to patients suffering from, or at risk of, impaired or reduced mucin production, for example, patients undergoing an inflammatory response, suffering from malnutrition, suffering from cystic fibrosis, malignancy, chronic inflammatory bowel diseases, ulcerative colitis and Crohn's disease, undergoing treatment which includes the administration of non-steroidal anti-inflammatory drugs, and the like, and after total parenteral nutrition. Further, it is found that the whey protein contains high levels of cysteine, an important antioxidant and immediate precursor of glutathioine. Therefore the nutritional supplement has the advantage that it can be used to provide supplemental nutrition to patients suffering from glutathione depletion and low antioxidant status. For example, the nutritional supplement may be used as a nutritional support for elderly or patients undergoing or recovering from acute or chronic inflammatory states.

The amount of the nutritional supplement required to be fed to a patient will vary depending upon factors such as the patient's condition, the patient's body weight, the age of the patient, and other sources of nutrition. However the required amount may be readily set by a medical practitioner. The nutritional supplement may be taken in multiple doses, for example 2 to 5 times, to make up the required daily amount or may be taken in a single dose.

By way of example, and not limitation, examples of the invention are now described for further illustration.

EXAMPLE 1

A ready-to-drink nutritional supplement is prepared. The nutritional supplement includes the following components:

| Component | Wet weight (% by weight of total composition) | Energy (%) |
| --- | --- | --- |
| Protein | 4.8 | 16 |
| Whey protein | | |
| Carbohydrate | 13 | 54 |
| Maltodextrin | | |
| Sucrose | | |
| Lipids | 2.8 g | 30 |
| High oleic safflower oil | | |
| Corn oil | | |
| Canola oil | | |
| Vitamins and Minerals | At least 5% of RDA | |

The lipid mixture is made up of about 25% by weight of saturated fatty acids, about 55% by weight of monounsaturated fatty acids and about 20% by weight of polyunsaturated fatty acids. The n-6:n-3 ratio is about 7:1. The formula contains 30 IU of Vitamin E and 60 mg of Vitamin C per serving.

The energy density of the supplement is 1000 kcal/l.

EXAMPLE 2

A ready-to-drink nutritional supplement is prepared. The nutritional supplement contains 16% of calories as protein of which 70% of the protein is hydrolyzed whey and the remainder is intact protein The remaining components are described in Example 1.

The energy density of the supplement is 1000 kcal/l.

EXAMPLE 3

A ready-to-drink nutritional supplement is prepared. The nutritional supplement contains 16% of calories as protein of which 50% to 100% may be from whey or hydrolyzed whey protein.

The energy density of the supplement is 1500 kcal/l.

EXAMPLE 4

A powdered nutritional supplement is prepared. The nutritional supplement contains 16% of calories as protein of which 50% to 100% may be whey or hydrolyzed whey protein. The supplement may contain a probiotic bacteria, preferably *L. johnsonii*.

EXAMPLE 5—Pediatric RTD

A ready-to-drink nutritional supplement is prepared that is tailored to the needs of growing children. For example the nutritional supplement contains a lower percentage of calories as protein preferably 10–12% of calories as protein and a higher percentage of calories as carbohydrate. The remaining components are as described in example 1.

The energy density of the supplement is 1000 kcal/l.

EXAMPLE 6—Pediatric Powder

A powdered nutritional supplement is prepared. The nutritional supplement contains 10–12% of calories as protein of which 50% to 100% may be whey or hydrolyzed whey protein. The supplement may contain probiotics preferably *B. bifidus* and *S. thermophilus*

EXAMPLE 7—Bar and Puddings

Alternate forms of the supplement are prepared such as puddings and snack bars. The pudding and flan forms are suitable for use by dysphagic subjects. All alternate forms are prepared to contain 10%–16% of calories as protein of which 50% to 100% may be whey or hydrolyzed whey.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

What is claimed is:

1. A nutritional supplement comprising:
    a protein source which provides at least 8% of the total energy of the supplement and which includes at least 50% by weight, of the protein source, whey protein;
    a lipid source having an omega 3 to 6 fatty acid ratio of approximately 5:1 to about 10:1 and which provides at least 18% of the total energy of the supplement;
    a carbohydrate source; and
    a nutrient profile including vitamin E and vitamin C.

2. The nutritional supplement of claim 1 wherein the whey protein includes a partially hydrolyzed whey protein.

3. The nutritional supplement of claim 1 wherein the whey protein includes a whey protein hydrolysate that comprises at least 50% by weight of the protein source.

4. The nutritional supplement of claim 1 wherein at least 50% by weight of the whey protein is hydrolyzed.

5. The nutritional supplement of claim 1 including caseino glycomacropeptide.

6. The nutritional supplement of claim 1 wherein the protein source provides approximately 10% to about 20% of total energy of the supplement.

7. The nutritional supplement of claim 1 wherein the lipid source comprises approximately 40% to about 65% by weight of monounsaturated fatty acids and approximately 15% to about 30% by weight of polyunsaturated fatty acids.

8. The nutritional supplement of claim 1 wherein the saturated fatty acid content is less than about 30% by weight.

9. The nutritional supplement of claim 1 wherein the lipid source provides approximately 25% to about 35% of total energy of the supplement.

10. The nutritional supplement of claim 1 wherein the carbohydrate source includes sucrose, corn syrup, and maltodextrin.

11. The nutritional supplement of claim 1 wherein the carbohydrate source provides approximately 50% to about 60% of total energy of the supplement.

12. The nutritional supplement of claim 1 including at least one nutrient selected from the group consisting of Vitamin E, Vitamin C, taurine, folic acid and vitamin B-12.

13. The nutritional supplement of claim 1 including at least one prebiotic fiber selected from the group consisting of inulin, acacia gum, resistant starch, dextran, xylo-oligosaccharide, fructooligosaccharide and combinations thereof.

14. The nutritional supplement of claim 1 including at least one probiotic micro-organism.

15. A composition for a companion animal which comprises:
    a protein source which provides at least 8% of the total energy of the composition and which includes at least 50% by weight whey protein;
    a lipid source having an omega 3 to 6 fatty acid ratio of approximately 5:1 to about 10:1 and which provides at least 18% of the total energy of the composition;

a carbohydrate source; and a balanced nutrient profile comprising at least vitamin E and vitamin C.

16. The composition of claim 15 including whey protein hydrolysate.

17. The composition of claim 15 wherein the protein source provides up to about 20% of total energy of the composition.

18. The composition of claim 15 including at least one prebiotic fiber selected from the group consisting of inulin, acacia gum, resistant starch, dextran, xylo-oligosaccharide, fructooligosaccharide and combinations thereof.

19. The composition of claim 15 including at least one probiotic micro-organism.

20. A method for producing a nutritional supplement comprising the steps of blending together a protein source, a lipid source, a carbohydrate source, and macro-nutrients to produce a product comprising a protein source which provides at least about 8% total energy of the supplement and which includes at least 50% by weight whey protein, a lipid source having an omega 3 to 6 fatty acid ratio of approximately 5:1 to about 10:1 and which provides at least 18% of the total energy of the supplement, a carbohydrate source, and vitamin E and vitamin C.

21. The method of claim 20 including the step of hydrolyzing the protein source with one or more enzymes at a pH ranging from approximately 6.6 to about 8.8 and a temperature of approximately 40 to about 70° C. at an enzyme concentration of approximately 0.5 to about 2.5 percent of the protein.

22. The method of claim 20 wherein the hydrolysis of the protein is carried out by enzyme treatment for approximately 5 to about 120 minutes.

23. The method of claim 20 including the step of adding to the product at least one probiotic or prebiotic.

* * * * *